(12) United States Patent
Motonishi et al.

(10) Patent No.: US 7,075,754 B2
(45) Date of Patent: Jul. 11, 2006

(54) MAGNETIC-HEAD GIMBAL ASSEMBLY CAPABLE OF REWORKING AND ITS PRODUCTION

(75) Inventors: Michiharu Motonishi, Niigata-ken (JP); Tohru Nakazawa, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 217 days.

(21) Appl. No.: 10/634,390

(22) Filed: Aug. 5, 2003

(65) Prior Publication Data

US 2005/0099730 A1 May 12, 2005

(30) Foreign Application Priority Data

Aug. 12, 2002 (JP) .............................. 2002-234832

(51) Int. Cl.
*G11B 21/16* (2006.01)
(52) U.S. Cl. .................................................. 360/245.3
(58) Field of Classification Search ............ 360/245.3, 360/245.8, 244.2, 245.9
See application file for complete search history.

(56) References Cited

U.S. PATENT DOCUMENTS

| 5,901,016 | A | * | 5/1999 | Iwamoto | 360/245.9 |
|---|---|---|---|---|---|
| 6,381,099 | B1 | * | 4/2002 | Mei | 360/244.3 |
| 6,515,832 | B1 | * | 2/2003 | Girard | 360/245.3 |
| 6,741,426 | B1 | * | 5/2004 | Girard | 360/245.4 |
| 6,847,505 | B1 | * | 1/2005 | Luo | 360/245.8 |
| 2001/0048574 | A1 | * | 12/2001 | Bhattacharya et al. | 360/244.2 |
| 2003/0161073 | A1 | * | 8/2003 | Horie et al. | 360/244.2 |

FOREIGN PATENT DOCUMENTS

| JP | 11-39629 | 2/1999 |
|---|---|---|
| JP | 2000-231709 | 8/2000 |
| JP | 2000-322854 | 11/2000 |

* cited by examiner

*Primary Examiner*—William Klimowicz
*Assistant Examiner*—Mark Blouin
(74) *Attorney, Agent, or Firm*—Brinks Hofer Gilson & Lione

(57) ABSTRACT

A method for mounting a flexible flexure, which has a slider fixed thereto and having an electro-magnetic conversion element integrally, on a load beam includes the steps of joining a main flexure, which has a junction piece for joining the load beam, to the load beam with the junction piece therebetween; inspecting characteristics by floating the electromagnetic conversion element onto a magnetic disc; when the characteristics do not satisfy a reference as a result of the inspection, removing the main flexure from the load beam by cleaving the main flexure at a cleavage part disposed in a vicinity of the junction piece; and at least one time joining a sub-flexure having no junction piece to the load beam, from which the main flexure is removed.

5 Claims, 6 Drawing Sheets

MAGNETIC-HEAD GIMBAL ASSEMBLY CAPABLE OF REWORKING AND ITS PRODUCTION

BACKGROUND OF THE INVENTION

1. Field of the Invention

The present invention relates to a magnetic-head assembly system suitable for use in writing and reading means of a hard magnetic-disc drive and a manufacturing method thereof.

2. Description of the Related Art

A so-called magnetic-head assembly used recently in a hard disc drive (HDD), as shown in FIG. 9, comprises a slider 201 having an integrally formed electromagnetic conversion element, a flexure (suspension) 202 made of a flexible metallic plate and bonded to the slider 201, and a load beam 203 with the leading edge fixed, by spot welding for example, to one end of the flexure 202, so that a gap between an ABS (air bearing surface) of the slider 201 and the hard magnetic-disc is maintained by the balancing between an elastic force of the flexure 202 and a fluid force produced between the slider 201 and the rotating magnetic hard disc. Such a conventional magnetic-head assembly is disclosed in Japanese Unexamined Patent Application Publication No. 7-73625, Japanese Unexamined Patent Application Publication No. 10-269538, Japanese Unexamined Patent Application Publication No. 2000-21709, and Japanese Unexamined Patent Application Publication No. 2000-105913, for example.

On such a kind of magnetic-head assembly, static and dynamic characteristic tests are performed before shipping.

While the static characteristic test is performed by applying an external magnetic field to the slider 201 as a unit test, the dynamic characteristic test is performed in a state the flexure 202 having the slider 201 bonded thereto and being fixed to the load beam 203 is mounted on a spin stand, etc., so that the hard magnetic-disc is rotated. Since the dynamic characteristic test is final, if the result does not match a reference value, this magnetic-head assembly is regarded as defective. Even if the reason of the failure comes from the slider 201 or the flexure 202, since it is difficult to peel the slider 201 off the flexure 202 or to remove the flexure 202 from the load beam 203, the entire magnetic-head assembly including the load beam 203 is regarded as defective, so that it cannot be reproduced. It would appear that the slider 201 is removed from the flexure 202 so that a new slider is attached to a new flexure; however, since the flexure 202 is very thin and fragile in comparison with the load beam 203 so that if the slider 201 is to be peeled off the flexure 202 fixed to the load beam 203, the flexure 202 is easily deflected and adhesive is difficult to be completely removed, so that the reproduction of the flexure 202 and the load beam 203 has been difficult.

SUMMARY OF THE INVENTION

The present invention has been made in view of the conventional problems described above, and it is an object thereof to provide a magnetic-head assembly capable of reusing component parts and its production.

A magnetic head assembly according to the present invention for achieving the above object comprises a flexible flexure comprising a slider fixed thereto and having an electro-magnetic conversion element integrally therewith; and a load beam for mounting the flexure, wherein the flexure comprises a junction piece protruded from an edge of the flexure for joining the load beam and a main flexure in that the junction piece is detached from the load beam by an external force pulling the flexure in the leading end direction in a state that the junction piece is joined to the load beam.

According to the structure of the present invention, in the case where characteristics of the slider in the magnetic head assembly having the main flexure mounted thereon have a problem, the main flexure can be easily detached from the load beam.

Moreover, according to the present invention, a sub-flexure may be joined to the load beam with the main flexure detached therefrom, so that the load beam can be reused, promoting effective use of resources.

Furthermore, a magnetic head assembly according to the present invention comprises a flexible flexure comprising a slider fixed thereto and having an electro-magnetic conversion element integrally therewith; and a load beam for mounting the flexure, wherein the flexure comprises a junction piece protruded from an edge of the flexure for joining the load beam and a main flexure having a cleavage part that is cleaved upon exertion of an external force pulling the flexure in the leading end direction in a state that the junction piece is joined to the load beam.

According to this structure, in the case where characteristics of the slider in the magnetic head assembly having the main flexure mounted thereon have a problem, the main flexure can be easily removed from the load beam by cleaving the main flexure at the cleavage part. Because it can be cleaved at the cleavage part, the main flexure can be securely and stably removed.

Moreover, according to the present invention, the sub-flexure may be mounted on the removed load beam, so that the load beam can be reused, promoting effective use of resources.

A method for manufacturing a magnetic head assembly according to the present invention, the manufacturing method for mounting a flexible flexure, which supports a slider having an electro-magnetic conversion element integrally, on a load beam, the method comprises the steps of detachably joining a main flexure, which has a junction piece for joining the load beam, to the load beam with the junction piece therebetween; inspecting characteristics by floating the electro-magnetic conversion element onto a magnetic disc; when the characteristics do not satisfy a reference as a result of the inspection, removing the main flexure by applying a pulling force to the main flexure so as to detach the junction piece from the load beam; and at least one time joining a sub-flexure, which has a junction piece located at a position different from that of the junction piece of the main flexure, to the load beam, from which the main flexure is detached, at the junction position.

According to the manufacturing method of the present invention, upon determining the magnetic disc assembly having the main flexure to be defective in the inspection process, the sub-flexure can be mounted on the load beam after the main flexure is removed from the load beam, so that the load beam can be reused, promoting effective use of resources.

A method for manufacturing a magnetic head assembly according to the present invention, the manufacturing method for mounting a flexible flexure, which has a slider fixed thereto and having an electro-magnetic conversion element integrally, on a load beam, the method also comprises the steps of joining a main flexure, which has a junction piece for joining the load beam, to the load beam with the junction piece therebetween; inspecting characteristics by floating the electromagnetic conversion element onto a magnetic disc; when the characteristics do not satisfy a reference as a result of the inspection, removing the main flexure from the load beam by cleaving the main flexure at a cleavage part disposed in a vicinity of the junction piece; and at least one time joining a sub-flexure, which can be joined at a position different from that of the junction piece, to the load beam, from which the main flexure is removed so as to leave the junction piece.

According to the manufacturing method of the present invention, upon determining the magnetic disc assembly having the main flexure to be defective in the inspection process, the sub-flexure can be mounted on the load beam after the step of removing the main flexure from the load beam by cleaving the main flexure at the cleavage part, so that the load beam can be reused, promoting effective use of resources. Because it can be cleaved at the cleavage part, the main flexure can be securely and stably removed.

DESCRIPTION OF THE PREFERRED EMBODIMENTS

Figure 1:
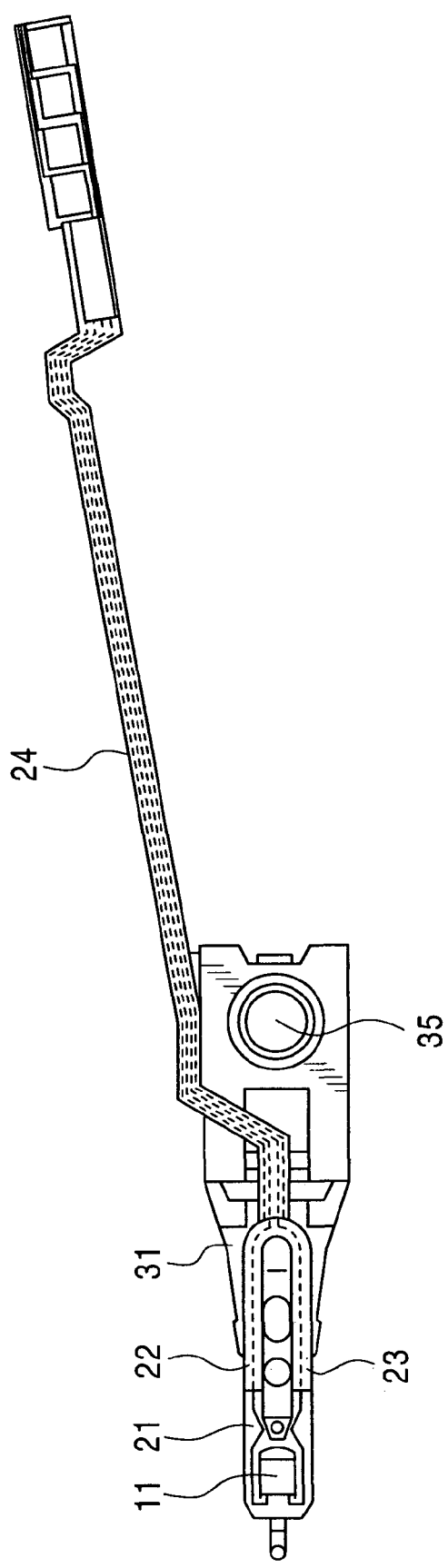
FIG. 1 is a front view of a magnetic-head assembly according to an embodiment of the present invention.

The present invention will be described below with reference to the drawings. FIG. 1 is a final drawing of a magnetic-head assembly according to an embodiment of the present invention for use in a hard disc drive.

In the magnetic-head assembly, a slider 11 having an electromagnetic conversion element (a magnetic head) 13 integrated therein is fixed to a flexible main flexure 21. The main flexure 21 is mounted at the end extremity of the load beam 31 in a state that the slider 11 is elastically suspended on the load beam 31. The main flexure 21 is a flexible metallic plate like a leaf spring having flexible printed circuit boards (FPCs) 22 and 23 on the surface bonded with adhesive. The flexible printed circuit boards 22 and 23 are separated from each other at terminals 22a and 22b, which are electrically connected to terminals (not shown) of the electro-magnetic conversion element, and extend alongside both-side edges so as to be further pulled out of the rear edges of the main flexure 21 and brought together to become a relay flexible printed circuit board 24. Terminals of the end of the relay flexible printed circuit board 24 are connected to a control circuit (electronic components) of a hard disc magnetic-disc apparatus to be mounted thereon.

Figure 2:
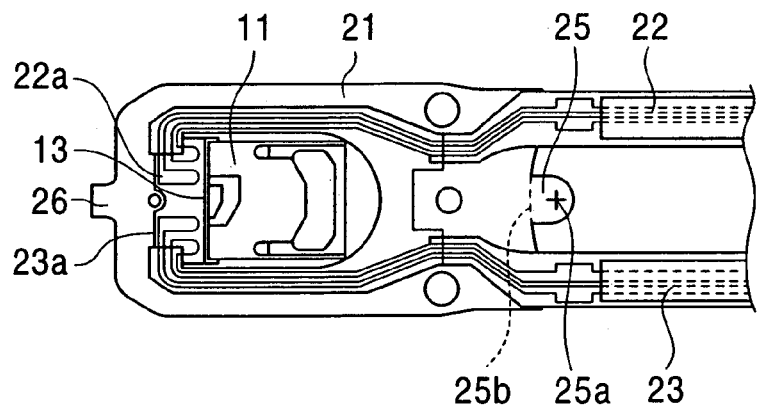
FIG. 2 is an enlarged front view of a main flexure according to the embodiment.

FIG. 2 is an enlarged view of the main flexure 21 according to the embodiment before being attached to the load beam 31. The main flexure 21 is provided with a semi-circular junction piece 25 protruded from substantially the central rear end (in the right in FIG. 2).

On the other hand, the load beam 31 is provided with a support part 32 disposed at the end extremity for supporting the main flexure 21 with a stepped part 31a therebetween. The support part 32 is provided with a semi-circular bonding part 33 formed in the vicinity of the stepped part 31a.

Figure 3:
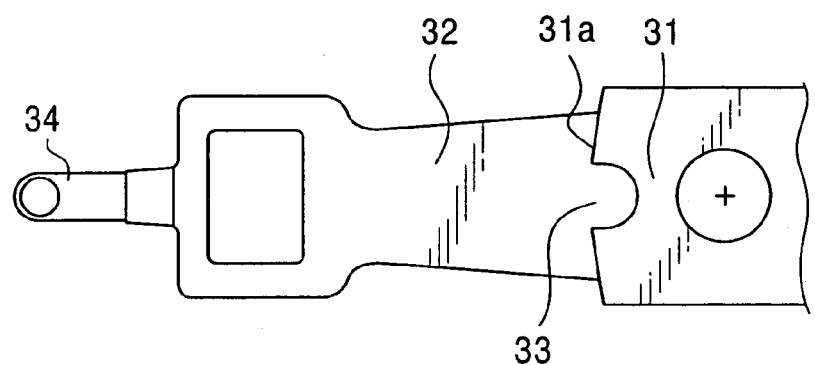
FIG. 3 is an enlarged front view showing a vicinity of the end extremity of a load beam according to the embodiment.
Figure 4:
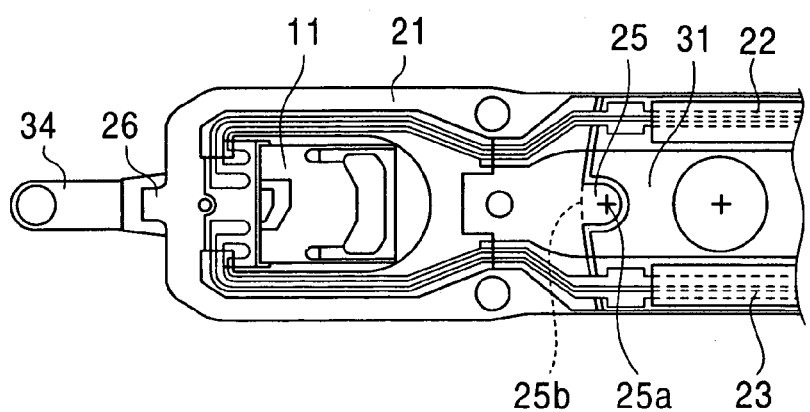
FIG. 4 is an enlarged front view showing a state that the main flexure according to the embodiment is attached to the load beam.

The junction piece 25 of the main flexure 21 is spot-welded to the bonding part 33 overlapped with the junction piece 25. Thus the main flexure 21 supports the slider 11 in a non-contact state that the slider 11 is separated from the support part 32 using the bonding part 33 as a fulcrum (a point of action), so that the main flexure 21 functions as a suspension deflecting in directions towards and away from the support part 32 so as to have predetermined deflection characteristics. The flexible printed circuit boards 22 and 23 are bonded to the load beam 31 at portions overlapping with the load beam 31. The spot welding, as shown in FIG. 3, is performed by laser at a cleavage position 25b shown by symbol + as a center in a state that the junction piece 25 is abutted and positioned to the bonding part 33. A tab 34 protruded from the end extremity of the load beam 31 is a member used in allowing running over a slope of a ramp disposed outside the hard magnetic-disc so as to evacuate the slider 11 from the hard magnetic-disc.

Next, the dynamic characteristic-test process of the magnetic-head assembly will be described.

First, the magnetic-head assembly having the main flexure 21 attached to the load beam 31 is mounted on an inspection machine such as a spin stand so as to perform predetermined characteristic tests thereon.

The magnetic-head assembly determined to be non-defective by the dynamic characteristic test results in a product.

Figure 8:
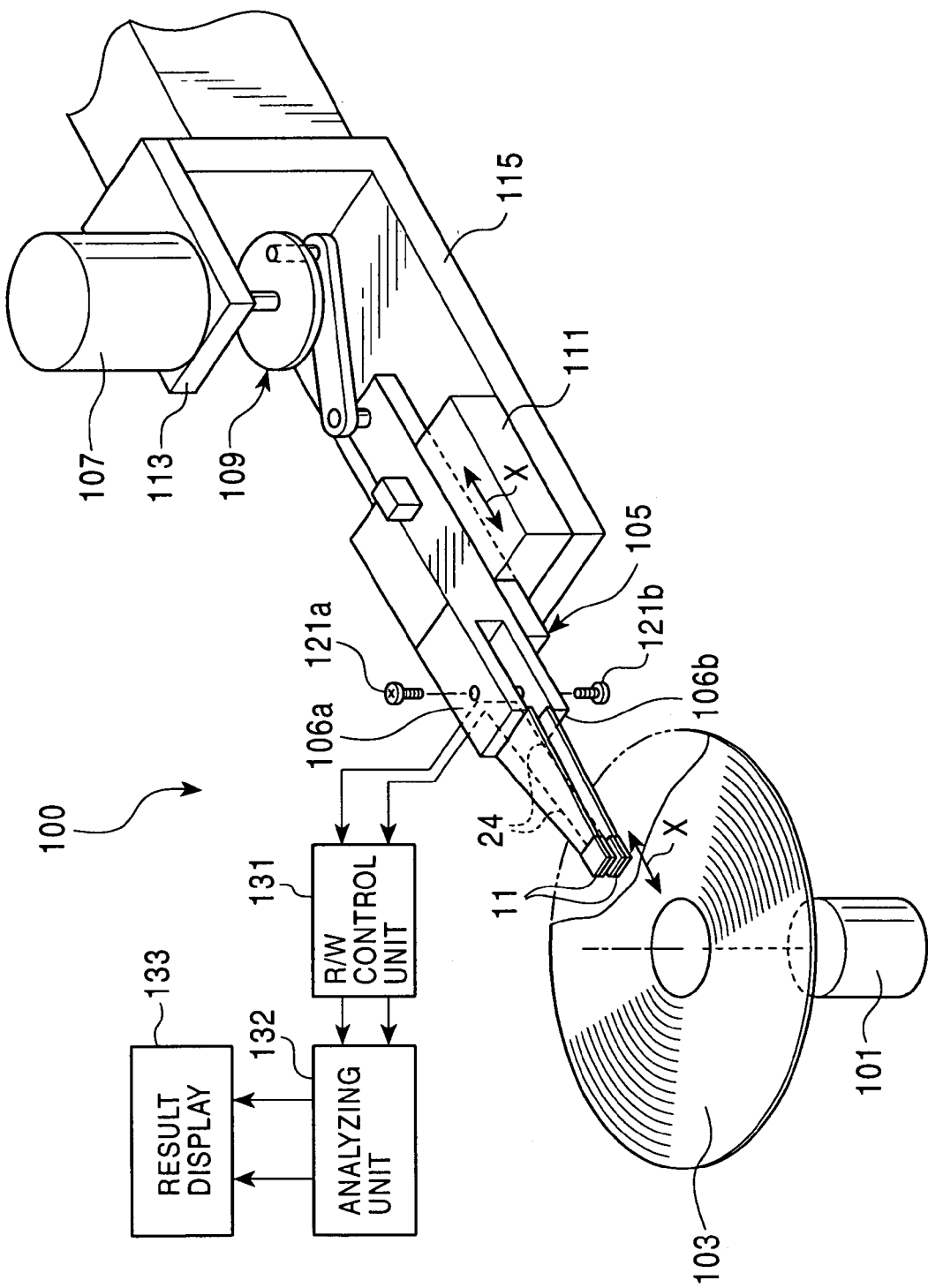
FIG. 8 is a schematic perspective view of an embodiment of test equipment used in a test process according to the present invention.
Figure 9:
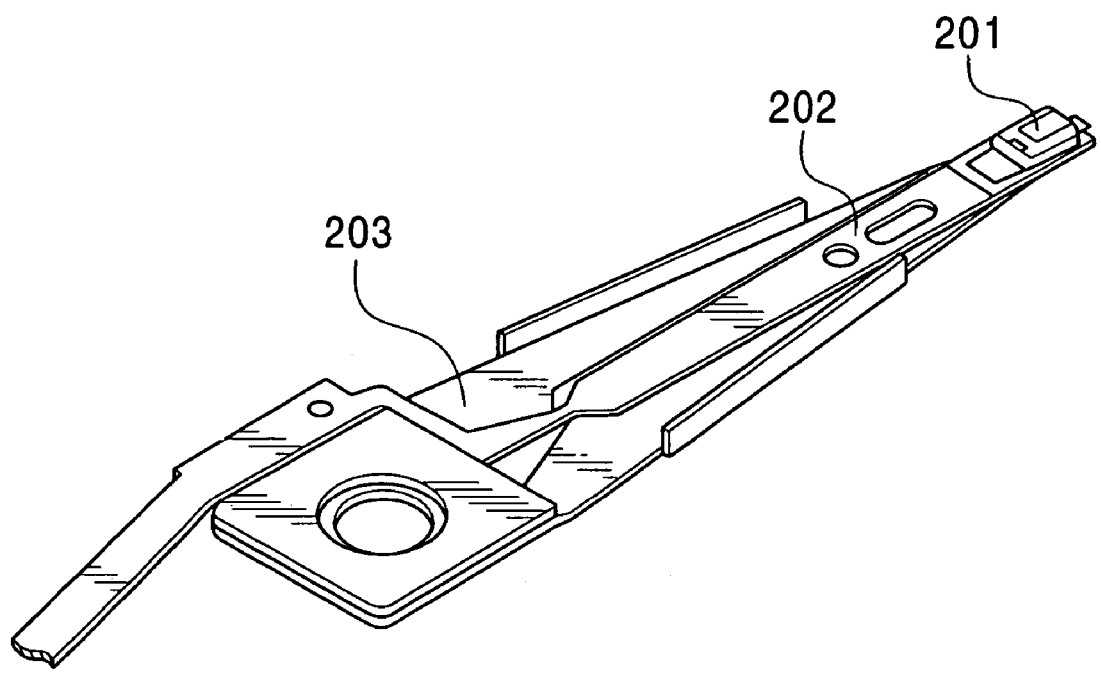
FIG. 9 is a perspective view of a conventional magnetic-head suspension.

FIG. 8 shows an embodiment of an inspection device for performing the dynamic characteristic test. This is a device for testing characteristics of a magnetic head for recording information on a disc-like magnetic-recording medium (referred to below as a magnetic disc) D and for reproducing the information in the magnetic disc D in a state that the magnetic disc D is rotated and floated. This inspection device 100, as essentially shown in FIG. 8, comprises a magnetic disc 103 rotated by a spindle motor 101, an arm 105 for fixing the magnetic-head assembly, a motor 107 for precisely moving the arm 105 as an actuator, a movement conversion mechanism 109, and a cross-roller table 111. These members are mounted on a base frame (not shown).

The motor 107 is fixed to a base 115 with a bracket 113 therebetween. The movement conversion mechanism 109 is arranged in a space formed between the base 115 and the bracket 113. The base 115 is arranged adjustably in position relative to the base frame according to need. The motor 107, such as a DC motor and a stepping motor, has a rotation precision capable of finely moving the magnetic head (slider) in the diametric direction (X-direction) of the magnetic disc 103 so as to trace a predetermined track.

The movement conversion mechanism 109 converts the rotational movement of the motor into the linear movement in the X-direction of the arm 105 with a crank mechanism.

The arm 105 is supported by the cross-roller table 111 slidably in the X-direction. The arm 105 is provided with U-shaped fixing portions 106a and 106b formed at the end extremity for detachably fixing the magnetic head assembly. To the fixing portions 106a and 106b, two magnetic head assemblies may be detachably held, respectively. According to the embodiment, base plates 35 of the load beams 31 are inserted into the fixing portions 106a and 106b so as to detachably fix them thereto by screwing screws 121a and 121b into tapped holes 35a (FIG. 1) with the fixing portions 106a and 106b therebetween, for example. The sliders 11 and 11 are faced to each other at a predetermined interval. End terminals of the relay flexible printed circuit board 24 are connected to input terminals of a reading/writing unit (R/W control unit) 131.

In a state that the magnetic head assembly is mounted on the inspection device 100 as described above, the slider 11 is moved to a predetermined track of the magnetic disc 103 by the inspection device 100 and the reading/writing in the magnetic disc 103 by the magnetic head of the slider 11 is controlled by the reading/writing unit 131. Furthermore, characteristics of the slider 11 are analyzed from signals read by the magnetic head of the slider 11 so as to display at least the analyzed result whether they satisfy predetermined characteristics on a result display 133. This result may be not only displayed but also be recorded or printed on a recording medium.

As a result of the inspection by the inspection device, the process when the slider 11 is determined to be defective is as follows.

Figure 5A:
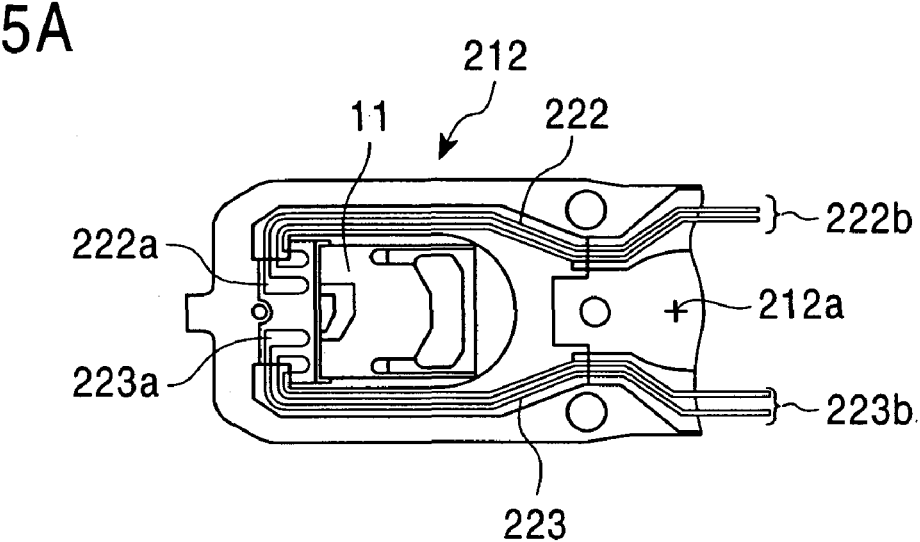
FIG. 5A is a front view of a sub-flexure according to the embodiment.
Figure 5B:
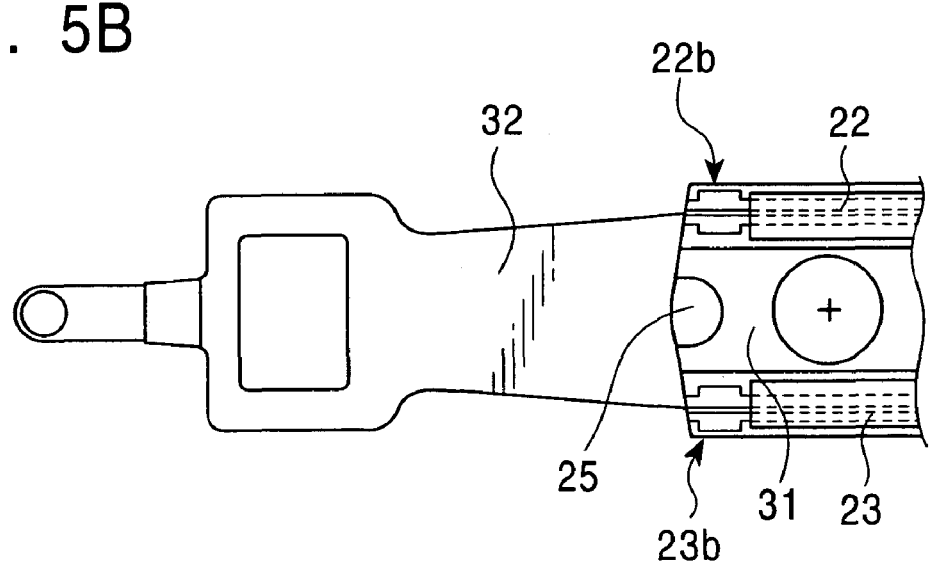
FIG. 5B is an enlarged front view showing the load beam after the main flexure is removed from the load beam.
Figure 6:
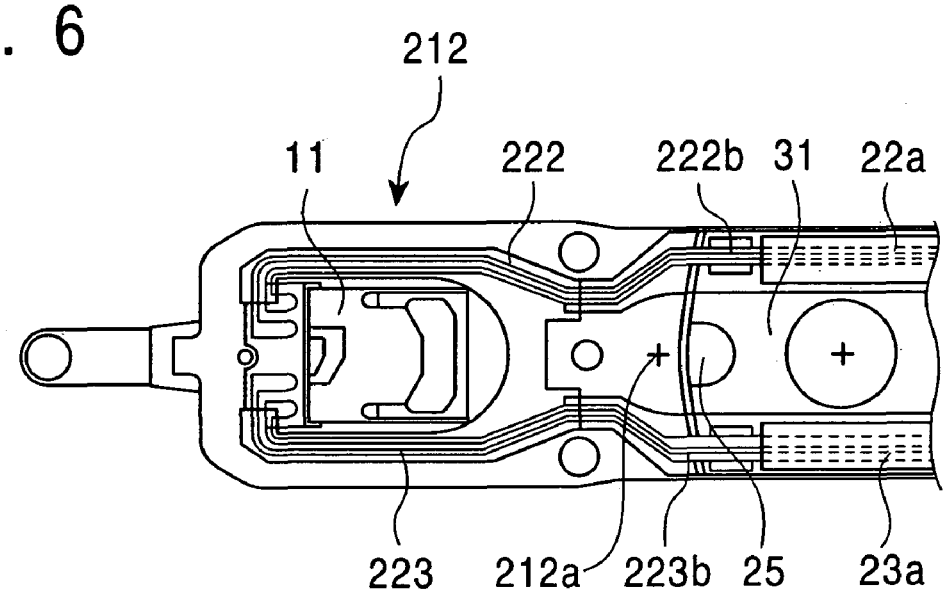
FIG. 6 is an enlarged front view showing a state that the sub-flexure according to the embodiment is attached to the load beam.

An inspector pulls a pulling piece 26 protruded from the end extremity of the main flexure 21 by pinching it with a predetermined jig. Then, the junction piece 25 is decoupled at the cleavage position 25b, so that only the main flexure 21 is removed from the load beam 31 leaving the junction piece 25. During the decoupling, the flexible printed circuit boards 22 and 23 are also decoupled in the vicinity of the boundary between the main flexure 21 and the load beam 31, so that parts 22b and 23b of the flexible printed circuit boards 22 and 23 and the relay flexible printed circuit board 24 are left in the load beam 31 (FIG. 5B).

In such a manner, according to the embodiment, if the slider 11 on the main flexure 21 is determined to be defective, the main flexure 21 can be simply removed from the load beam 31.

Recently, along with a recent progress toward high density in the magnetic recording, there have been advances in the reduction in size of the slider and the reduction in thickness of the flexure. In the conventional magnetic head, the reduction in thickness of the flexure may also reduce the thickness of the relay flexible printed circuit board tending to be liable to deflect. This deflection (rolling) is disadvantageous for handling. Whereas, according to the present invention, by using a material different from that of the main flexure 21, the relay flexible printed circuit board can be designed to have a thickness suitable for the handling.

According to the embodiment, since the junction piece 25 may be left in the bonding part 33, the cleavage position 25b may be of any structure as long as it is easily cleavable, such as perforations, kerfs, or constriction.

Next, a structure of a sub-flexure 212 to be mounted on the load beam 31 (FIG. 5B) with the main flexure 21 eliminated will be described with reference to FIG. 5A. The embodiment is characterized that the sub-flexure 212 is provided in addition to the main flexure 21; the main flexure 21 can be easily removed from the load beam 31; and the sub-flexure 212 can be mounted on the load beam 31 with the main flexure 21 eliminated.

The sub-flexure 212 has no equivalent of the junction piece 25 of the main flexure 21, and furthermore, although the sub-flexure 212 has no equivalents of the terminal parts 22b and 23b of the flexible printed circuit boards 22 and 23 and the relay flexible printed circuit board 24, the sub-flexure 212 comprises flexible printed circuit boards 222 and 223 and terminal parts 222a and 223a respectively corresponding to the flexible printed circuit boards 22 and 23 and the terminal parts 22b and 23b, and terminal parts 222b and 223b that are overlapped with a conduction wiring pattern of the terminal parts 22b and 23b when the flexible printed circuit boards 222 and 223 are mounted on the load beam 31.

The process when the sub-flexure 212 is mounted on the load beam 31 is as follows.

In a state that the sub-flexure 212 is located at a predetermined position on the load beam 31, a bonding position 212a shown by symbol + is spot-welded. The bonding position 212a is a position different from a bonding position 25a of the main flexure 21, and a corresponding position on the support part 32 of the load beam 31 is also different from the position of the main flexure 21.

Then, the terminal parts 222b and 223b that are respectively overlapped with conduction wiring patterns corresponding to the terminal parts 22b and 23b are fixed together by a predetermined method such as soldering.

The sub-flexure 212 mounted in such a manner supports the slider 11 using the bonding point as a fulcrum in a state that the slider 11 is separated from the support part 32 at a predetermined distance so as to support the slider 11 movably in directions towards and away from the support part 32 so as to have predetermined deflection characteristics. The deflection characteristics of the sub-flexure 212 are substantially the same as those of the main flexure 21.

On the magnetic-head assembly having the sub-flexure 212 mounted to the load beam 31 in such a manner, a dynamic characteristic test is performed by the above-mentioned inspection device, for example. The magnetic-head assembly determined to be non-defective by the dynamic characteristic test results in a product as a re-workable product.

As described above, according to the embodiment, as a result of the inspection performed by the dynamic inspection device on the magnetic head assembly having the main flexure 21 fixed to the load beam 31, if the slider 11 is determined to be defective, since the main flexure 21 can be removed from the load beam 31 and the sub-flexure 212 can be attached to the load beam 31 with the main flexure 21 eliminated, the load beam 31 can be reused as it is.

Figure 7:
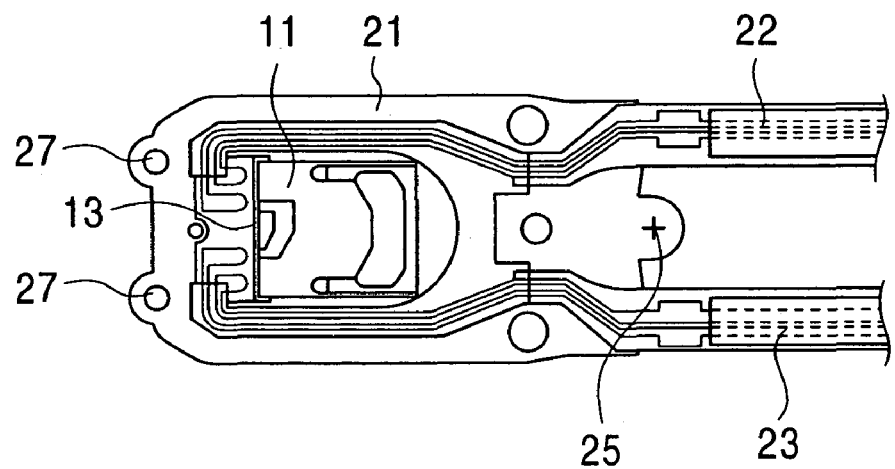
FIG. 7 is an enlarged front view of a flexure according to another embodiment of the present invention.

According to the embodiment described above, the main flexure 21 may be pulled by pinching the junction piece 25 thereof; alternatively, in order to pull the main flexure 21 without deflection in the longitudinal direction, as shown in FIG. 7, the main flexure 21 may be provided with two or more holes 27 formed at edges so as to be fitted by a pin for pulling the main flexure 21.

According to the embodiment shown in the drawings, upon determining the main flexure 21 to be defective in the dynamic characteristic test, the main flexure 21 is removed in a state that the junction piece 25 is left in the bonding part 33; alternatively, the junction piece 25 may be also removed from the bonding part 33 integrally with the main flexure 21. In this case, the junction piece 25 of the main flexure 21 is not provided with the cleavage position 25b.

Furthermore, in the case where the sub-flexure 212 is attached also having the same structure of the thin plate itself as that of the main flexure, i.e., the structure having a part corresponding to the junction piece 25 of the main flexure 21, the position of spot welding may be different from the position where the main flexure is welded, or the sub-flexure 212 may also be welded at a spot larger than that of the main flexure 21 overlapping therewith.

Also, according to the embodiment shown in the drawings, in the case where the main flexure 21 is defective, part of the flexible printed circuit boards 22 and 23 and the relay flexible printed circuit board 24 are left; alternatively the entire flexible printed circuit boards 22, 23 and 24 may be removed together.

As is apparent from the above description, according to the manufacturing method of the magnetic-head assembly of the present invention, if the slider having the flexure or the electro-magnetic conversion element attached to the load beam is determined to be defective as a result of the dynamic inspection, since the main flexure can be removed from the load beam and the sub-flexure can be attached to the load beam with the main flexure eliminated, the load beam can be reused.

According to the magnetic-head assembly of the present invention, since the main flexure attached to the load beam can be simply removed therefrom and the sub-flexure can be attached to the load beam with the main flexure eliminated, the load beam can be reused.

What is claimed is:

1. A magnetic head assembly comprising:
   a flexure comprising a slider fixed thereto and having an electro-magnetic conversion element integrally therewith; and
   a load beam for mounting the flexure,
   wherein the flexure comprises a junction piece protruded from an edge of the flexure for joining the load beam and a main flexure having a cleavage part that is cleaved upon exertion of an external force pulling the main flexure in a leading end direction in a state that the junction piece is left joined to the load beam.

2. An assembly according to claim 1, wherein the main flexure comprises a flexible printed circuit board for connecting between a first terminal of the electromagnetic conversion element of the slider and an electronic component to be mounted, and the flexible printed circuit board is fixed to the load beam, and
   wherein when the main flexure is removed from the load beam in a state that the flexible printed circuit board is fixed, a portion between the load beam and the main flexure is cleaved.

3. A magnetic head assembly according to claim 1, wherein the cleavage part is selected from the group consisting of a perforation, a kerf, and a constriction.

4. A magnetic head assembly comprising:
   a flexure comprising a slider fixed thereto and having an electro-magnetic conversion element integrally therewith; and
   a load beam for mounting the flexure,
   wherein the flexure is a sub-flexure and a junction piece of a main flexure that is cleaved at a cleavage part of the main flexure remains on the load beam, the sub-flexure being joined to the load beam at a position different from the junction piece of the main flexure.

5. An assembly according to claim 4, wherein a first flexible printed circuit board is provided on the load beam and the sub-flexure comprises a second flexible printed circuit board connected to a second terminal of the electromagnetic conversion element of the slider and a conduction pattern corresponding to the flexible printed circuit board.

* * * * *

UNITED STATES PATENT AND TRADEMARK OFFICE
CERTIFICATE OF CORRECTION

| | |
|---|---|
| PATENT NO. | : 7,075,754 B2 |
| APPLICATION NO. | : 10/634390 |
| DATED | : July 11, 2006 |
| INVENTOR(S) | : Michiharu Motonishi et al. |

It is certified that error appears in the above-identified patent and that said Letters Patent is hereby corrected as shown below:

<u>On the Title Page</u>

In column 2, lines 6-7, under "ABSTRACT", delete "electromagnetic" and substitute --electro-magnetic-- in its place.

Column 8, in claim 2, line 3, after "terminal of the" delete "electromagnetic" and substitute --electro-magnetic-- in its place.

Signed and Sealed this

Twenty-sixth Day of December, 2006

JON W. DUDAS
*Director of the United States Patent and Trademark Office*